United States Patent
Agassi et al.

(10) Patent No.: US 7,853,959 B2
(45) Date of Patent: Dec. 14, 2010

(54) BUSINESS PROCESS EXTENSION FOR PRODUCTIVITY SUITE APPLICATION

(75) Inventors: Shai E. Agassi, Los Gatos, CA (US); Frederick E. Samson, Wayne, PA (US); Dirk Wodtke, Aptos, CA (US); Nir Kol, Raanana (IL); Iryna Vogler-Ivashchanka, Los Altos, CA (US); Dennis Brian Moore, Hillsborough, CA (US)

(73) Assignee: SAP AG, Waldorf (DE)

( * ) Notice: Subject to any disclaimer, the term of this patent is extended or adjusted under 35 U.S.C. 154(b) by 1071 days.

(21) Appl. No.: 11/350,294

(22) Filed: Feb. 7, 2006

(65) Prior Publication Data
US 2006/0271933 A1    Nov. 30, 2006

Related U.S. Application Data

(60) Provisional application No. 60/673,815, filed on Apr. 22, 2005, provisional application No. 60/650,516, filed on Feb. 8, 2005.

(51) Int. Cl.
G06F 9/44  (2006.01)
G06F 15/16 (2006.01)

(52) U.S. Cl. ................................ 719/319; 709/203
(58) Field of Classification Search .................. 719/319
See application file for complete search history.

(56) References Cited

U.S. PATENT DOCUMENTS 4,862,357 A  8/1989 Ahlstrom et al.
5,021,953 A  6/1991 Webber et al.
5,237,499 A  8/1993 Garback
5,331,546 A  7/1994 Webber et al.
5,404,488 A  4/1995 Kerrigan et al.
5,477,447 A  12/1995 Luciw et al.
5,749,079 A  5/1998 Yong et al.
5,754,782 A  5/1998 Masada (Continued)

FOREIGN PATENT DOCUMENTS

EP    1460538    1/2004

(Continued)

OTHER PUBLICATIONS

EP Application No. 06 724 504.3-2221; EP communicaiton dated Mar. 4, 2008.

(Continued)

*Primary Examiner*—H. S. Sough
*Assistant Examiner*—Abdou K Seye
(74) *Attorney, Agent, or Firm*—Blakely Sokoloff Taylor & Zafman

(57) ABSTRACT

Methods and apparatuses to provide extension to a groupware client to enable the groupware client to access a workflow of a business process from the context of the groupware client. An enterprise server that manages the workflow can interface with the groupware client to provide action on the workflow from within the context of the groupware client. The enterprise server passes the action to the enterprise backend to implement the action on the workflow. Thus, action on the workflow from the groupware client affects the workflow on the enterprise level. Status information about the workflow may be persisted in the groupware client to enable continued interaction with the workflow from within the groupware client.

19 Claims, 4 Drawing Sheets

U.S. PATENT DOCUMENTS

| | | | |
|---|---|---|---|
| 5,864,848 A | 1/1999 | Horvitz et al. | |
| 5,946,464 A * | 8/1999 | Kito et al. | 709/202 |
| 5,948,040 A | 9/1999 | DeLorme et al. | |
| 6,009,408 A | 12/1999 | Buchanan | |
| 6,026,410 A | 2/2000 | Allen et al. | |
| 6,085,201 A | 7/2000 | Tso et al. | |
| 6,119,095 A | 9/2000 | Morita | |
| 6,209,018 B1 | 3/2001 | Ben-Shachar et al. | |
| 6,442,526 B1 | 8/2002 | Vance et al. | |
| 6,622,147 B1 | 9/2003 | Smiga et al. | |
| 6,632,251 B1 | 10/2003 | Rutten et al. | |
| 6,732,080 B1 | 5/2004 | Blants | |
| 6,801,226 B1 | 10/2004 | Daughtrey | |
| 7,050,986 B1 | 5/2006 | Vance et al. | |
| 7,080,021 B1 | 7/2006 | McCulloch | |
| 7,100,195 B1 | 8/2006 | Underwood | |
| 7,167,919 B2 | 1/2007 | Iwamoto et al. | |
| 7,305,381 B1 | 12/2007 | Poppink et al. | |
| 7,310,646 B2 * | 12/2007 | Rangadass et al. | 707/100 |
| 7,343,302 B2 | 3/2008 | Aratow et al. | |
| 2001/0034736 A1 | 10/2001 | Eylon et al. | |
| 2002/0077842 A1 | 6/2002 | Charisius et al. | |
| 2002/0152101 A1 | 10/2002 | Lawson et al. | |
| 2003/0120526 A1 | 6/2003 | Altman et al. | |
| 2003/0135565 A1 | 7/2003 | Estrada | |
| 2003/0135659 A1 | 7/2003 | Bellotti et al. | |
| 2003/0144892 A1 | 7/2003 | Cowan et al. | |
| 2003/0167281 A1 | 9/2003 | Cohen et al. | |
| 2004/0044987 A1 | 3/2004 | Kompalli et al. | |
| 2004/0083195 A1 | 4/2004 | McCord et al. | |
| 2004/0122835 A1 | 6/2004 | McKibben et al. | |
| 2004/0122853 A1 | 6/2004 | Moore | |
| 2004/0143723 A1 | 7/2004 | Acker et al. | |
| 2004/0148299 A1 | 7/2004 | Teegan et al. | |
| 2005/0010819 A1 | 1/2005 | Williams et al. | |
| 2005/0171963 A1 | 8/2005 | Barrett | |
| 2005/0209904 A1 * | 9/2005 | Hayashi | 705/9 |
| 2007/0094110 A1 | 4/2007 | McCrea | |

FOREIGN PATENT DOCUMENTS

| WO | WO-2004/021185 | 3/2004 |
|---|---|---|

OTHER PUBLICATIONS

Final Office Action mailed May 9, 2008 for pending U.S. Appl. No. 11/312,435.

International Application No. PCT/EP2006/001110 Int'l Preliminary Report on Patentability dated Aug. 23, 2007.

About Smart Tags, http://office.microsoft.com/en-us/assistance/HP030833041033.aspx printed Mar. 15, 2005.

Andreshak: Teched Frontline News for Office Information Bridge Framework, https://blogs.officezealot.com/joe/archive/2004/05/25.aspx printed Mar. 15, 2005.

Int'l application No. PCT/EP2006/003706 Int'l Preliminary Report on Patentability (Chapter 1) dated Nov. 1, 2007; 8 pages.

Int'l application No. PCT/EP2006/003707 Int'l Preliminary Report on Patentability (chapter 1) dated Oct. 23, 2007; 8 pages.

International Search Report and Written Opinion, PCT Application No. PCT/EP2006/003706, filed Apr. 21, 2006, mailed Aug. 22, 2006, 11 pages, 10 pages.

International Search Report and Written Opinion, PCT Application No. PCT/EP2006/003708, filed Apr. 21, 2006, mailed Aug. 22, 2006, 12 pages, 12 pages.

Seven Tasks to Get Started With Microsoft Exchange, Windows IT Pro, InstantDoc #2702, www.windowsitpro.com, XP-002333125, (Sep. 1996), 19 pages.

Lai, Kum-Yew et al., Object Lens: A 'Spreadsheet' for Cooperative Work, ACM Transactions on Office Information Systems, vol. 6, No. 4, (Oct. 1988), 332-353.

Non-Final Office Action mailed Oct. 29, 2008 for U.S. Appl. No. 11/312,435.

Dan Woods, "Packaged Composite Applications: A Liberating Force for the User Interface", internet document, Oct. 2003, p. 1-4, XP-002349437.

Anonymous, "Business Add-Ins", internet document, Jul. 24, 2002, p. 1-15, XP-002296620.

John Clarkson, "Creating Add-Ins in Microsoft Excel 97", internet document, Apr. 1999, p. 1-3, XP-002296622.

Anind K. Dey et al., "CyberDesk: A Framework for Providing Self-Integrating Context-Aware Services", *1998 International Conference on Intelligent User Interfaces,* New York, New York, Jan. 6, 1998, p. 47-54, XP-002155976.

International Search Report and Written Opinion, PCT Application No. PCT/EP2006/001110, filed Feb. 8, 2006, mailed Apr. 6, 2006, 11 pages.

Non-Final Office Action for U.S. Appl. No. 11/408,845 dated May 19, 2009; 33 pages.

Final Office Action for U.S. Appl. No. 11/409,379, Mailed Dec. 9, 2009, 23 Pages.

Non-Final Office Action for U.S. Appl. No. 11/409,379, Mailed Aug. 5, 2009, 48 pages.

Final Office Action for U.S. Appl. No. 11/408,845 Mailed Nov. 19, 2009, 13 Pages.

Advisory Action for U.S. Appl. No. 11/408,845, Mailed Feb. 16, 2010, 5 Pages.

Non-Final Office Action for U.S. Appl. No. 11/408,844, Mailed Apr. 1, 2010, 47 Pages.

Non-Final Office Action for U.S. Appl. No. 11/409,379, Mailed May 10, 2010, 31 Pages.

Non-Final Office Action for U.S. Appl. No. 11/409,378, Mailed May 24, 2010, 27 Pages.

Non-Final Office Action for U.S. Appl. No. 11/408,845, Mailed Jun. 24, 2010, 9 Pages.

* cited by examiner

BUSINESS PROCESS EXTENSION FOR PRODUCTIVITY SUITE APPLICATION

RELATED APPLICATIONS

The present application claims the benefit of priority under 35 U.S.C. §119(e) to U.S. Provisional Application No. 60/650,516, filed Feb. 8, 2005, and to U.S. Provisional Application No. 60/673,815, filed Apr. 22, 2005.

FIELD

Embodiments of the invention relate to business process workflow management, and more particularly to providing access to a business process workflow from a productivity software application.

BACKGROUND

In enterprise systems, workflows are often used by participants of a workflow in performing work. A workflow generally refers to a flow of tasks associated with a business process. Enterprises increasingly rely on computers for performing tasks related to a business process, and thus, for executing the tasks of a workflow. Computers can provide mechanisms for modeling, executing, and/or controlling workflows, typically through a graphical user interface (GUI). A GUI may be related to a particular program or application that acts as an interface for operating on a workflow.

Traditional interfaces to workflows involve multiple, unrelated desktop applications. Thus, a participant in a workflow may receive a notification of one or more tasks via an email application or other collaborative software, and then need to launch a Web browser or other application to access an enterprise system that will enable the participant to complete the task(s). The use of multiple, independent applications has at least the defect of being time-consuming. Depending on the applications being used, the use of the multiple, independent applications can result in security and/or access issues. The applications a workflow participant uses for performing work may be inadequately designed for enterprise access control/security typically involved in interacting with enterprise data. Thus, one or more applications that a workflow participant uses with regularity may be less secure and/or less capable of dealing with enterprise business process tasks.

SUMMARY

An extension to a groupware client can enable the groupware client to access a workflow associated with a business process from the context of the groupware client. Action on the workflow from within the groupware client affects the workflow on the enterprise level. An enterprise server that manages the workflow can interface with the groupware client through the extension to enable the action on the workflow to be implemented in the enterprise backend services. Information related to the workflow is persisted within the groupware client to provide updated information regarding the workflow within the groupware client.

DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
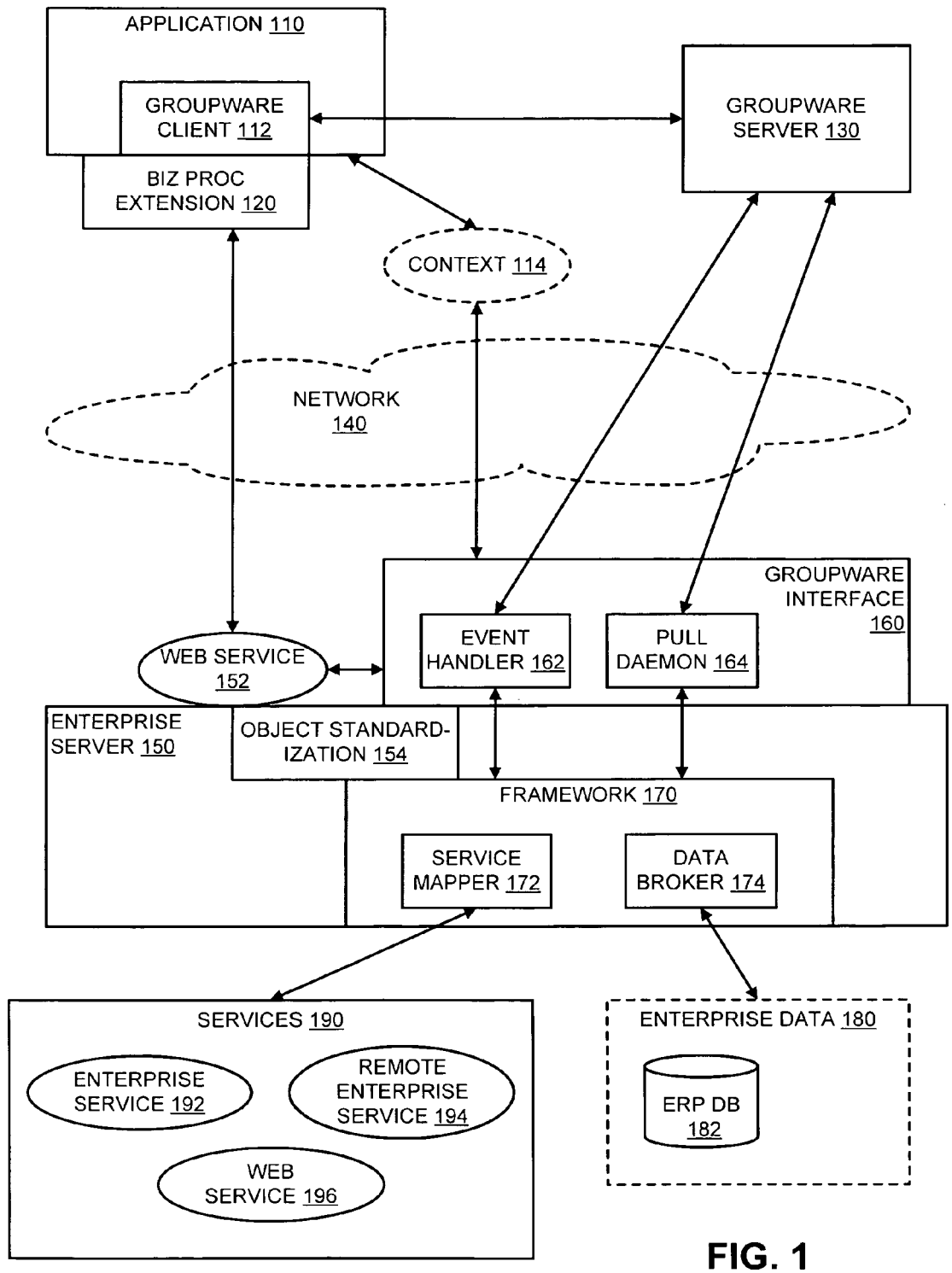
FIG. 1 is a block diagram of an embodiment of a groupware client with a business process extension to access an enterprise server.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

Extensions can be provided to a groupware client to enable access to a business process via the groupware client. As used herein, groupware refers to any of a type of collaborative software, for example, email software, spreadsheet software, etc. Groupware is generally associated with a server that provides data and/or functionality to the software. A client refers to a program, routine, etc., that allows interaction with the groupware server. In one embodiment, a client refers to an application with a user interface that includes native functionality to access the groupware server. In an alternate embodiment, a client may operate/exist/execute independently of an application that has a user interface, and may in fact provide groupware server access functionality to multiple applications. Thus, a groupware client as referred to herein may refer to a groupware application, or to a program that enables one or more applications to access a groupware server. With extensions as described herein, a workflow participant can access and interact with a business process through a groupware client. In one embodiment, the groupware client is generated as a modeled software program.

As used herein, a business process refers broadly to a process used to perform work within an enterprise. One or more workflows may be associated with the business process through which to accomplish the work. A workflow includes one or more phases, each phase an action or activity to be executed/performed in furthering progress towards the end-goal of the business process. For example, a "hiring" business process may include a "finding candidates" workflow, an "interviewing" workflow, etc., each of which may have multiple actions or activities associated (e.g., scheduling an interview time, arranging travel for the candidate, etc.), which may be executed to accomplish the end goal of hiring an individual. Each phase of a workflow is referred to herein as a "task," which may be a single item of work (an "action"), or a set of actions (an "activity"). A workflow may include structured and/or ad hoc tasks of a business process. A workflow may include context in terms of organizational roles of participants, as well as documents, forms, or other data.

The extensions provided to the groupware client can enable integration of business process tasks into the environment of the groupware client (or an application with which the groupware client is associated). A participant in a workflow may be able to generate a workflow, receive status or other information regarding one or more tasks of a workflow, and/or process or execute a task of a workflow. A groupware client can access data objects, forms, functions, services, data structures, and/or processes through enterprise-interface extensions (e.g., via services), to access items that exist or are managed in a business backend system. The business backend system includes logic and services to manage and control the data and processes. The business backend can be provided with extensions (as needed) to enable the groupware client to access the backend services. In one embodiment, an intermediate manager or server is provided to enable access from the groupware client to backend enterprise services.

The integration of access to business process tasks enables the workflow participant to act on contextual information (e.g., reports, documents, hints, data, etc.) locally from within a groupware application. The user interface of a groupware application is likely to be familiar to the workflow participant, and may allow the integration of tools of the groupware application (e.g., spellchecking, translations, etc.) into the performance of the workflow task. The workflow participant can interact (e.g., create, process, track, set preferences, etc.) with a workflow through the familiar user interface of the groupware client or associated application.

In contrast to the integrated use of groupware with a workflow as described herein, current email notifications or other traditional functions of groupware focus only on a single task or action with respect to the workflow. With the integration of groupware functionality and enterprise access, the business process information associated with a workflow presented in the groupware application is persisted with the integrated groupware client. For purposes of simplicity in description, use of the term "groupware client" may refer to the groupware client and/or its associated groupware application(s). Persisting the information refers to making the information available to the workflow participant either continuously, or upon request, and from within the context of the groupware client. For example, status information may be provided to the groupware client to provide updated information for the business process within the groupware client. Also, or in the alternative, status information could be accessible, for example, when the workflow participant selects an item/icon or executes an action within the groupware client. Persisting the information may include storing the information locally to the groupware client, or within a storage location within a groupware server, in addition to storing the information within the enterprise backend.

FIG. 1 is a block diagram of an embodiment of a groupware client with a business process extension to access an enterprise server. Application 110 represents any software program or other application that includes groupware client 112, or accesses groupware client 112. Groupware client 112 provides interaction with groupware server 130, which provides groupware information and/or services for groupware application 110. Groupware server 130 may be, for example, an email server (e.g., an EXCHANGE server available from MICROSOFT CORPORATION of Redmond, Wash.). In addition to traditional operation by groupware server 130, groupware server 130 may include extensions to enable groupware client 112 to access enterprise services and/or data for application 110.

In one embodiment, groupware server 130 is coupled over network 140 to groupware interface 160 of enterprise server 150. Network 140 may include one or more local area networks (LANs), including wireless or wired networks, and hardware with which to operate on the network. Network 140 may also include other networks, for example, wide area networks, enterprise networks, virtual private networks (VPNs), etc. In one embodiment, groupware server 130 exists within the same local network as groupware interface 160 and/or enterprise server 150, although existence within the same local network is not a requirement. Enterprise server 150 represents both hardware and software that operates to provide enterprise data and services access and/or management.

Groupware interface 160 represents hardware and/or software to provide groupware-enterprise integration/management. In one embodiment, part or all of groupware interface 160 is incorporated within groupware server 130. In another embodiment, part or all of groupware interface 160 is incorporated within enterprise server 150. In another embodiment, part or all of groupware interface 160 is a standalone entity in hardware and/or software. In one embodiment, groupware interface 160 includes one or more components based on Enterprise Services Architecture (ESA) available in conjunction with mySAP and NETWEAVER products available from SAP AG of Walldorf, Germany, and/or one or more components based on MICROSOFT .NET. In one embodiment, groupware interface 160 is a server or manager product (e.g., a MENDOCINO or DUET server available from collaborative efforts of MICROSOFT CORPORATION and SAP AG). Thus, groupware interface 160 may also be referred to as an interface server, or an enterprise-groupware manager.

Groupware interface 160 provides one or more mechanisms to enable interaction between groupware client 112 and enterprise server 150. The interaction may include requests between groupware client 112 and enterprise server 150, and responses to the requests. From the groupware side, groupware client 112 may make requests and/or send actions or commands generated from within application 110 to perform a function with respect to enterprise data related to a workflow that exists within the context of application 110. Enterprise server 150 may provide reports, errors, status or other information, data objects, service access, etc., to application 110 through groupware interface 160.

Groupware server 130 may interface with event handler 162 and/or pull daemon 164. In one embodiment, status information is provided to groupware server 130 via event handler 162. Event handler 162 refers to software and/or hardware that monitors events within the context of a business process. Thus, if an event occurs (e.g., an action, a timing occurrence, a scheduling event, a triggering of a condition, etc.), event handler 162 may provide information to update groupware server 130 regarding the business process. In one embodiment, groupware server 130 includes status information that can be passed to groupware client 112. In addition to the operation of event handler 162, or as an alternative, pull daemon 164 can provide status information to groupware server 130. Pull daemon 164 refers to software and/or hardware to provide a request-driven passing of status information to groupware server 130. Thus, event handler 162 provides information passing at the initiation of groupware interface 160 (and thus, of enterprise server 150), while pull daemon provides information passing at the initiation of groupware server 130. Thus, groupware server 130 may send a request to enterprise server 150 for status for one or more business processes, and receive information via pull daemon 164.

In one embodiment, groupware interface 160 "holds" information related to a workflow currently accessed within application 110 when application 110 is offline, or disconnected/unable to access groupware server 130 and/or groupware interface 160 or enterprise server 150. When access is restored and application 110 comes back online, information may be synchronized with information local to application 110 related to the workflow. Synchronization of information may also occur when application 110 is online, such as described below with regard to pull daemon 164 and event handler 162. Groupware interface 160 may include a repository or storage wherein information can be locally held or temporarily contained until a synchronization opportunity (e.g., an event, an action, at a time, etc.).

Pull daemon 164 and event handler 162 can obtain information and status updates through interaction with enterprise data 180, or with one or more services 190 via framework 170. Framework 170 provides a framework of logic and services that enable groupware interface 160 to provide enterprise-level information to groupware server 130. In one embodiment, groupware interface 160 and framework 170 are part of the same software and/or hardware module. In one embodiment, groupware interface 160 could be considered a "groupware server" layer of a groupware-enterprise manager/server, and framework 170 could be considered an "enterprise" layer of the groupware-enterprise manager/server.

Enterprise server 150 includes framework 170, which represents structured logic with which to provide status information to groupware server 130, and optionally receive requests or queries from groupware server 130. In one embodiment framework 170 includes a composite application framework (e.g., SAP CAF). Framework 170 may include service mapper 172, which represents logic to map requests or queries to an appropriate enterprise service. Data broker 174 represents logic to access enterprise data 180, including, for example, enterprise resource planning (ERP) database (DB) 182. In one embodiment, framework 170 models backend logic to provide appropriate data and service access to groupware server 130. In one embodiment, a composite application framework provides backend logic to a front-end (e.g., an application). As shown, groupware server 130 may interface enterprise server 150 through extensions in much the same way a composite application can interface the enterprise backend.

Services 190 broadly represent functions that can be performed on enterprise data or with respect to enterprise data. For example, services 190 may include enterprise service 192, which represents functions that can be performed with respect to a local enterprise. A local enterprise refers to an enterprise to which the workflow belongs. A local enterprise may include one or more domains, domain servers, local area networks (LANs) whether wired or wireless, virtual LANs (VLANs), etc. An enterprise is local with respect to a server that generally provides access to a device of a user (specifically here is enterprise server 150).

A local enterprise may be in contrast to a remote enterprise, which represents an enterprise that is not local. One or more elements of information or data objects, or one or more functions or services related to a workflow, or operable on a workflow, may exist within an enterprise remote to enterprise server 150 (i.e., managed separately). In one embodiment, one or more remote enterprise services 194 can provide functionality to application 110 in relation to a workflow. One example of access to remote enterprise service 194 may include access within a cooperative relationship between enterprises, e.g., with a grid trading network. A grid trading network generally enables users to access enterprise data and share functionality across separate enterprises. More information regarding grid trading networks may be found in U.S. patent application Ser. No. 11/264,415, entitled "Grid Processing in a Trading Network," U.S. patent application Ser. No. 11/263,828, entitled "Grid Processing Dynamic Screensaver,", now abandoned and U.S. patent application Ser. No. 11/264,414, entitled "Grid Processing User Tools," all filed Oct. 31, 2005.

Services 190 may also include Web service 196, which represents one or more services that may provide access to one or more particular websites, or to the Internet in general. Service mapper 174 may determine which of services 190 can/should be invoked to fulfill a request/action received from groupware client 112. In one embodiment, service mapper 174 may determine that multiple services 190 are appropriate services with which fulfill a request. Thus, multiple of services 190 may be selected simultaneously, or substantially simultaneously (e.g., temporally proximate in time, selected by a single operation or routine, selected to execute in parallel, etc.) to perform provide functionality. Note that the use of multiple of services 190 may signify the use of multiple enterprise services 192 and/or the use of disparate services (e.g., an enterprise service 192 and a remote enterprise service 194, or any combination).

In one embodiment, in addition to access to enterprise server 150 through groupware server 130, or as an alternative to the access through groupware server 130, groupware client 112 and/or application 110 may include business (biz) process extension 120. Business process extension 120 may be similar to the extensions that could be provided to groupware server 130, although they could be different. Business process extension 120 may include a repository of information and/or a metadata processing engine to be able to provide status information and persistence of business process information to groupware client 112. If application 110 were to be executed offline, the repository or storage may store information that can later be passed to enterprise server 150 and/or synchronized with the enterprise. Business process extension 120 may provide logic with which groupware client 112 interfaces with groupware server 130, and/or processes information exchanged with groupware server 130. In one embodiment, business process extension 120 enables groupware client 112 with an interface to enterprise 150 through Web service 152, which represents one or more Web services with which to access enterprise server 150. Web service 152 represents one or more services accessible to application 110/groupware client 112. Access to a Web service is typically authorization-based, and may include registering. Web service 152 can provide access functionality to enterprise server 150 and/or groupware interface 160. Web service 152 refers to a function or routine through which the access can be accomplished.

In one embodiment, enterprise server 150 includes object standardization 154, which represents one or more software and/or hardware modules. With the integration of enterprise data access in application 110, application 110 may potentially have access to any of multiple different types of data objects. Object standardization 154 can provide a common interface for objects sent to application 110. Object standardization 154 can provide a common formatting or "look and feel" of objects to enhance the seamless nature of the enterprise access integration. In one embodiment, object standardization 154 includes a translator between the enterprise backend formatting and the context of application 110. Thus, an object may be accessed and presented in application 110 in a way that the object takes on the look and feel of application 110. Text may be formatted, icons may be matched, etc. Additionally, reports, alerts, functions, etc., received from the enterprise can be presented in the application with the same feel of similar items that occur locally within application 110.

Application 110 includes a context or a work environment, indicated by context 114. Context 114 could include anything through which contextual information may be derived (e.g., user name and password, preferences, documents, software version/status information, authorizations, keys, or any other information that may indicate a preference or authorization for access to data). Context 114 may be passed to enterprise server 150 and/or to groupware interface 160 through any interaction mechanism described above, or through other known mechanisms. Thus, enterprise server 150 can react to the context of application 110 when providing information. Filters may be employed to limit data passed or services available that are appropriate for an authorization indicated by context 114. In one embodiment, filters may be provided to provide data/services that match preferences, or are associated with a particular work context or application being used. Thus, the adaptability and power of enterprise server 150 can be available to a workflow participant through a groupware application.

Figure 2:
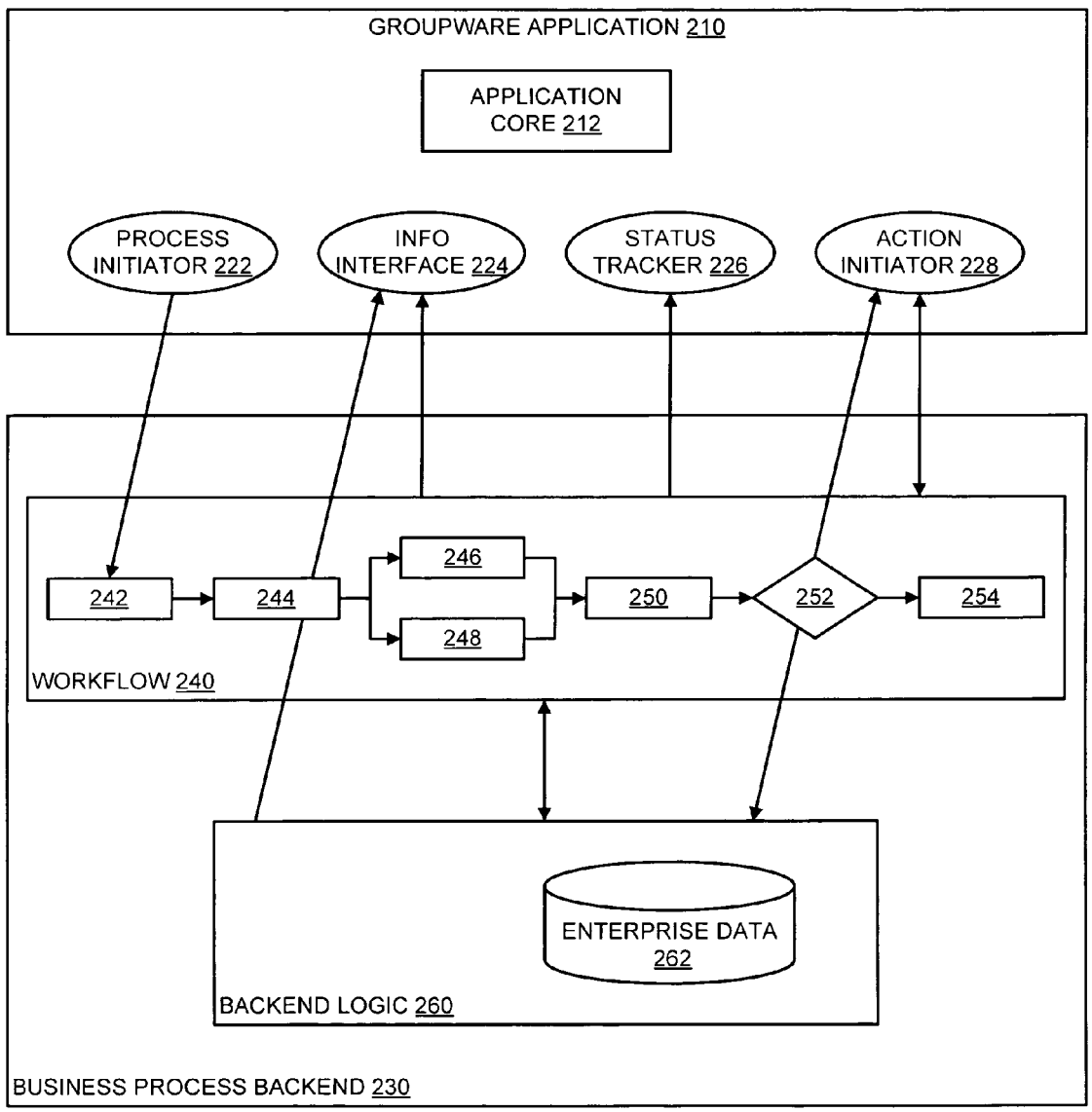
FIG. 2 is a block diagram of an embodiment of a groupware application to access a workflow of a business process.

FIG. 2 is a block diagram of an embodiment of a groupware application to access a workflow of a business process. Groupware application 210 represents a groupware application and/or associated groupware client according to any embodiment described herein. Application 210 includes application core 212, which represents code and logic that provides the general functions of application 210. Business process extensions are provided for application 210, and application core 212 represents the application without the extensions.

Groupware application 210 includes, or has access to one or more extensions, which may include process initiator 222, information interface 224, status tracker 226, and action initiator 228, each of which may be implemented as one or more modules. Additional or alternative extensions can be provided to result in an application that includes some, all, or different modules than what is shown in FIG. 2. Each of the modules may provide structured logic to implement one or more functions related to accessing or otherwise interacting with a workflow associated with a business process.

Process initiator 222 provides logic to initiate a workflow from within the context of application 210. Thus, a workflow participant can generate a new workflow from within the context of application 210. Rather than simply initiating a request for a new workflow, one or more actions from within application 210 can actually interface with business process backend 230 to generate the new workflow. As depicted, process initiator 222 may initiate workflow 240, and begin phase 242. Note that application 210 is not limited to interacting with workflows generated from within the context of application 210. Workflow 240 includes phases 242-254, which may represent any number of discrete parts of workflow 240. The phases may be conditioned on certain events or conditions, may be performed in parallel, etc.

Information interface 224 can provide an interface to gather data and status or other information related to a workflow accessed within application 210. Information interface 224 may gather information from workflow 240 and/or from backend logic 260. Information interface 224 may be or include a repository of information that is obtained from business process backend 230, which may be included within an enterprise server. Backend logic 260 represents any service or data, which includes enterprise data 262, which can be accessible to application 210 through business process integration as described herein. Backend logic 260 is to be understood as any data or function related to data that can be provided at the enterprise level through an enterprise server.

Status tracker 226 provides a mechanism that can monitor one or more workflows. Status tracker 226 may include a routine or other logic that can receive input regarding workflow 240 and update information in application 210 related to workflow 240. For example, status tracker 226 may store information in a status information repository or datastructure or other mechanism through which business information is persisted within application 210. Status tracker 226 may provide logic through which an icon or text displayed in a GUI associated with application 210 is modified. Status tracker 226 receives information related to workflow 240.

Action initiator 228 can send or receive an action, or request for an action. On the sending side, action initiator 228 can send an action to any phase within workflow 240, for example, to perform a task associated with the phase. Action initiator 228 can likewise send an action to backend logic 260 to cause or result in action on workflow 240 from within the enterprise-level, rather than from within application 210. Thus, action may be directly or indirectly taken on workflow 240 from an action performed within application 210. Action initiator 228 may include functions associated with buttons or icons available from within application 210. Thus, for example, clicking or double-clicking a particular icon may make a change to workflow 240, or a change to a view provided on workflow 240 (e.g., change from a list view to a table view, etc.), or launch a guided process related to workflow 240.

On the receiving side, action initiator may receive updated information or a trigger from external to application 210 that can cause a function to occur within application 210. In one embodiment, such a received action can cause a function of application core 212 to be performed.

Business process extension 120, object standardization 154, and groupware interface 160 of FIG. 1, and process initiator 222, information interface 224, status tracker 226, and action initiator 228 can be implemented as modules, which may include hardware, software, and/or a combination of these. Software included within modules can instruct a machine to implement techniques described herein. Additionally, software can be used to describe how to manufacture a device to perform the functions of these components. Such software may be provided via an article of manufacture by a machine/electronic device/hardware.

An article of manufacture may include a machine accessible/readable medium having content to provide instructions, data, etc. The content may result in an electronic device or computing system performing various operations or executions described. A machine accessible medium includes any mechanism that provides (i.e., stores and/or transmits) information/content/instructions in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.). The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download (i.e., providing the code for access) over a communication medium may be understood as providing an article of manufacture with such content described above.

Figure 3:
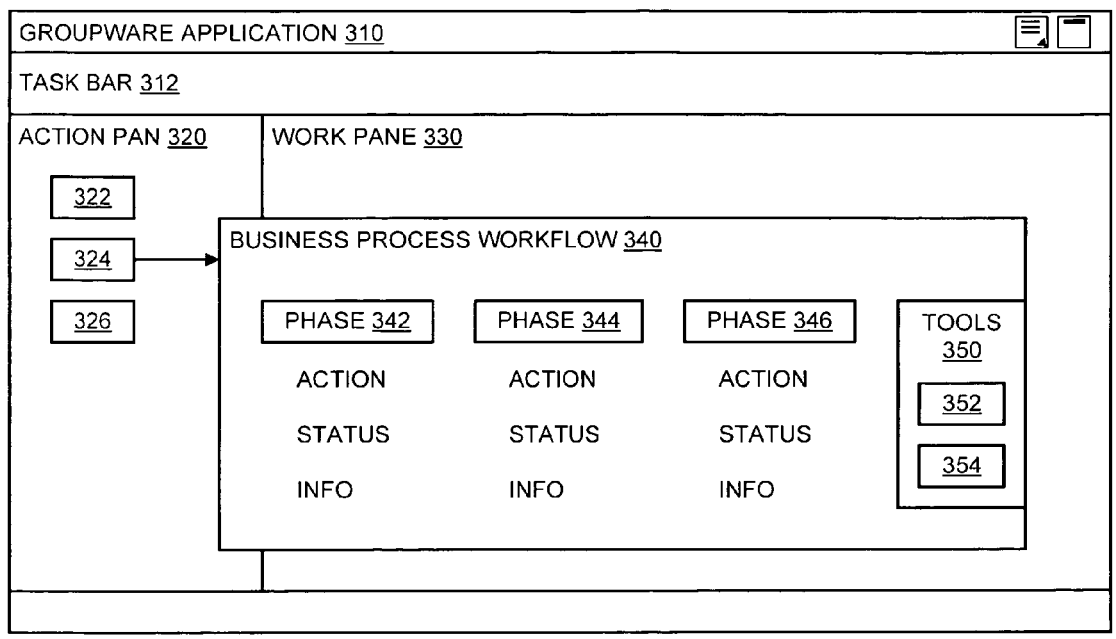
FIG. 3 is a block diagram of an embodiment of a groupware application with a business process workflow extension.

FIG. 3 is a block diagram of an embodiment of a groupware application with a business process workflow extension. Groupware application 310 is one example of a groupware client and/or application according to any embodiment described herein. Groupware application 310 may be an application such as would be found in an office productivity software suite (e.g., EXCEL or OUTLOOK in MICROSOFT OFFICE available from MICROSOFT CORPORATION). Groupware application 310 includes task bar 312, which can provide application 310 with various icons and menus to provide functionality to a user of the application. One example of a possible integration of a productivity software suite with an enterprise services backend system can be found in the mail client of FIG. 1 of previously filed patent application Ser. No. 11/333,961, entitled "Deep Enterprise Search," and filed Jan. 17, 2006, now abandoned.

In one embodiment, application 310 includes action pane 320, which can provide additional functionality to a user. Action pane 320 may provide navigational advantages over task bar 312, in addition to having different functionality. Action pane 320 includes functionality tools 322-326, which may be links, icons, tabs, etc., to provide one or more navigational functions and/or functions for performing work. In one embodiment, action pane 320 includes tab 324, which provides access to a business process workflow within the context of application 310. In addition to action pane 320, application 310 includes work pane 330, which provides an area in which to view and perform work done in application 310. Note that the layout of action pane 320 and work pane 330 is merely for purposes of illustration, and action pane 320 may be located with task bar 312, or anywhere else within application 310.

Selection of, or action on tab 324 can provide a view of business process workflow 340. The view of workflow 340 can be within work pane 330, or alternatively, within a separate window or pane (as shown in FIG. 3). Thus, an appropriate view may be enabled in which enterprise-level access tools may be provided within the context of application 310. The view of workflow 340 may also include tools 350, with tabs 352-354 for actions specific to working on workflow 340. One embodiment of a view of workflow 340 includes providing a view of each phase of the workflow. Thus, view of workflow 340 presents phases 342-346. Each phase may include one or more actions or activities to be accomplished, status information, and/or other information related to the phase. Thus, within each phase, a user of application 310 that is a participant of workflow 340 may be able to access data objects of the enterprise that manages workflow 340. Note that a participant in the workflow may have an action to accomplish to further the workflow towards completion, and/or may have a monitoring/overseership role in the workflow.

Integration of the enterprise-level access may be as seamless to the application user as having one or more additional icons or tabs with which to work within application 310, and being able to view and process, manage, initiate, perform work on, etc., a workflow without having to change applications.

Figure 4:
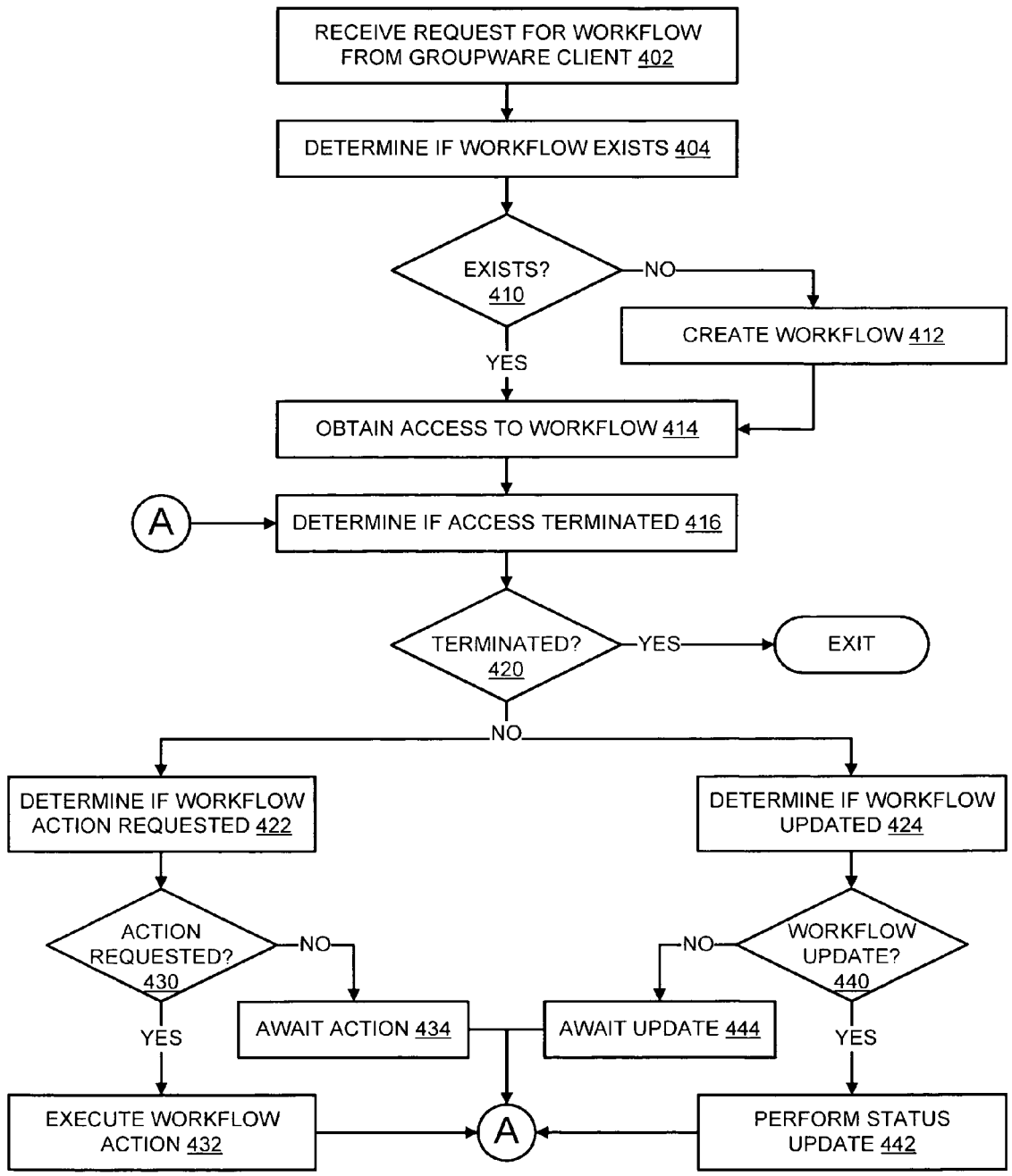
FIG. 4 is a flow diagram of an embodiment of interacting with a business process with a groupware client.

FIG. 4 is a flow diagram of an embodiment of interacting with a business process with a groupware client. An enterprise server (or an enterprise-groupware server) receives a request for a workflow from a groupware client, 402. In one embodiment, receiving the request is accomplished via a groupware server. Thus, the groupware client can provide the request to the groupware server, which then forwards the request to the enterprise server. Information sent in response to the request could be accomplished through the groupware server and/or enterprise-groupware manager as a proxy between the groupware client and the enterprise.

The request can be a request to access or perform work on a task of a workflow, or to create a new workflow. The server may determine if the requested workflow requested exists, 404. If the workflow does not exist, 410, the workflow is created, 412, which means that a user can initiate a new workflow from within the context of a groupware application as opposed to using a specific application as traditionally done.

Once the workflow exists, the groupware client is able to obtain access to the workflow from the server, 414. The server can grant access consistent with preferences, authorizations, or other contextual information. Thus, enterprise security policies can be enforced even though the access to the workflow occurs from within the context of the groupware client.

The server may determine if the access by the groupware client is terminated, 416. Determining when the access is terminated may be accomplished, for example, through a communication procedure/protocol mechanism between the groupware client and the server. As long as the access is valid, the server may continue to provide status information and receive actions by the groupware client with respect to the workflow. If the access is terminated, 420, the process ends. If the access is still valid, 420, the user may perform work and/or receive updates about the workflow. Thus, two sub-procedures are shown in parallel, which may occur in parallel (at least in part), or may occur in sequence. The sub-procedures may be event-driven and/or polled or timing driven.

The server may determine if a workflow action is requested, 422. A workflow action request refers to a request or command to perform a change or provide information for a phase in the workflow or a data object associated with the workflow. If an action is requested, 430, the action is executed, 432. Executing the action will depend on the nature of the action, and may include changing or adding information related to a data object, changing a status of an action, changing metadata related to a phase of the workflow, etc. If no action is requested, the server may await an action, 434, for the valid period of access by the groupware client, 416-434.

The server may determine if the workflow is updated, 424. The workflow may be updated from changes within the enterprise, or by the performance of a task by a user external to the groupware client. Thus, as one example, if the user of the groupware client was awaiting approval from a manager to perform a next phase of a workflow, the granting of approval is a change to the workflow that could be provided to the user. If there is a workflow update, 440, the server/system can perform a status update, 442. The server may provide status information to indicate the change, and the information may be passed out to the groupware client until being made accessible to a user. If no update is made to the workflow, 440, the server may await an update, 444. Status may be "updated" periodically even if nothing has changed within the workflow. Status may also, or alternatively, be updated upon the occurrence of an event that changes the status of the workflow.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for performing an action of a business process, comprising:

receiving at a server side enterprise server that manages a workflow instance, a request from a client side groupware client application to perform an action at the enterprise server on a task of the workflow, the request generated by executing the action within a context of the groupware client application to request the action be applied at the enterprise server, wherein the groupware client application executes on a client device separate from the enterprise server, and has native functionality to access an associated groupware server, separate from the enterprise server that manages the workflow instance, and does not have native functionality to interact with the enterprise server, and wherein the groupware client application includes an extension module executing under the groupware client application to enable the groupware client application to interact with the enterprise server to generate the request for the action within the context of the groupware client application, bypassing the groupware server;

implementing the action in enterprise backend services to apply the action to the workflow instance, in response to receiving the request to perform the action from the groupware client application, to affect the task of the workflow instance at an enterprise level of an enterprise with which the enterprise server is associated, the backend services accessible to the groupware client via the extension module that enables the groupware client application to interact with the enterprise server and bypass the groupware server; and in response to the request, providing enterprise-level status information related to the workflow instance from the enterprise server to the groupware client application via the extension module to enable the groupware client application to provide a groupware-based user interface for one or more tasks of the workflow instance to perform actions on the tasks and receive status through the groupware client application, wherein performing actions on the tasks and receiving workflow instance status provide for viewing and performing operations on the workflow instance within the context of the groupware client application.

2. The method of claim 1, wherein receiving the request to perform the action on the task at the enterprise server comprises:

receiving the action directly from the groupware client application via web services.

3. The method of claim 1, wherein receiving the action on the task further comprises:

sending the task from the enterprise server to the groupware client application; and receiving the request to perform the action on the task in response to sending the task to the groupware client application.

4. The method of claim 3, wherein sending the task to the groupware client application comprises:

sending a task related to the context of the groupware client to the groupware client application.

5. The method of claim 1, wherein receiving the request to perform the action on the task further comprises:

receiving a request for an action associated with initiating a workflow instance at the groupware client application through the application extension.

6. The method of claim 1, wherein performing the action includes one or more of monitoring, tracking, executing, completing, or initiating.

7. The method of claim 1, wherein receiving the request to perform the action executed within the context of the groupware client application comprises:

receiving the action executed within the context of an office productivity software application.

8. The method of claim 1, wherein implementing the action to affect the task comprises:

modifying an enterprise business object related to the task.

9. The method of claim 1, wherein providing the status information to enable the groupware client application to provide the interface to the one or more tasks comprises:

providing the status information to enable the groupware client application to interface to a task unrelated to the context of the groupware client application.

10. The method of claim 1, wherein providing the enterprise-level status information to the groupware client application comprises:

providing the status information to from the enterprise server to the associated groupware server, the groupware server to provide the status information to the groupware client application.

11. The method of claim 10, wherein providing the status information to the groupware server comprises:

providing the status information to the groupware server in response to the occurrence of an event affecting the workflow instance.

12. The method of claim 10, wherein providing the status information to the groupware server comprises:

providing the status information to a groupware server in response to a request for the status information by the groupware server.

13. An article of manufacture comprising a machine accessible storage medium having content stored thereon to provide instructions to cause a machine to perform operations including:

receiving a request from a groupware client application to perform an action on a task of an enterprise-level workflow instance, the request generated by executing the action within a context of the groupware client application to request the action be applied at an enterprise server that manages the workflow instance, wherein the groupware client application is to execute on a client device separate from the enterprise server, and has native functionality to access an associated groupware server, separate from the enterprise server, and does not have native functionality to interact with the enterprise server, and wherein the groupware client application includes an enterprise-access extension executing under the groupware client application to enable the groupware client application to interact with the enterprise server to generate the request for the action within the context of the groupware client application, bypassing the groupware server;

implementing the action in enterprise backend services to apply the action to the workflow instance, in response to receiving the request to perform the action from the groupware client application, to affect the task of the workflow instance at an enterprise level of an enterprise to which the workflow instance belongs, the backend services accessible to the groupware client application via the enterprise-access extension that enables the groupware client application to interact with the enterprise server and bypass the groupware server; and in response to the request, providing enterprise-level status information related to the workflow instance to the groupware client application via the extension to enable the groupware client application to provide a groupware-based user interface for one or more tasks of the workflow instance via the groupware client application to perform actions on the tasks and receive status through the groupware client application, wherein performing actions on the tasks and receiving workflow instance status provide for viewing and performing operations on the workflow instance within the context of the qroupware client application.

14. The article of claim 13, wherein the content to provide instructions for receiving the request to perform the action from the groupware client application comprises:

content to provide instructions for receiving the request to perform the action from an email client.

15. The article of claim 13, wherein the content to provide instructions for providing the enterprise-level status information comprises:

content to provide instructions for synchronizing information related to the workflow instance stored in an enterprise database with information related to the workflow instance that exists locally to the groupware client application.

16. An apparatus comprising:

an interface server coupled to an enterprise server to receive, from within a work environment of a groupware application to execute on a client separate from the enterprise server, a request for enterprise-level data related to a workflow instance, access a backend service of the enterprise server to fulfill the request, and persist status information related to the workflow instance in the groupware application;

wherein the groupware application to have native functionality to access an associated groupware server, separate from the enterprise server, and not have native functionality to interact with the enterprise server, and wherein the groupware application to include an enterprise-access extension to execute under the groupware application to enable the groupware application to interact with the enterprise server to generate the request for an action to be performed within a context of the groupware application to be applied to the workflow instance at the enterprise server, bypassing the groupware server;

the interface server to implement the action in enterprise backend services to apply the action to the workflow instance, in response to receiving the request to perform the action from the groupware client application, to affect a task of the workflow instance at an enterprise level of an enterprise to which the workflow instance belongs, the backend services accessible to the groupware client application via the enterprise-access extension that enables the groupware client application to interact with the enterprise server and bypass the groupware server, and in response to the request, provide enterprise-level status information related to the workflow instance to the groupware client application via the extension to enable the groupware client application to provide a groupware-based user interface for one or more tasks of the workflow instance via the groupware client application to perform actions on the tasks and receive status through the groupware client application, wherein performing actions on the tasks and receiving workflow instance status provide for viewing and performing operations on the workflow instance within the context of the groupware client application;

a service mapper of the enterprise server to map the request to a service to enable the interface server to access the backend service; and a data broker of the enterprise server to access enterprise data related to the workflow instance to persist in the groupware application.

17. The apparatus of claim 16, the service mapper to map the request to a service comprises:

the service mapper to map the request to one or more of a local enterprise service, a remote enterprise service, or a Web service.

18. The apparatus of claim 16, further comprising:

a repository local to the groupware application, coupled to the interface server, to receive status information from the interface server, and store information related to the workflow instance.

19. The apparatus of claim 18, the repository to store information related to the workflow instance comprising:

the repository to store modifications made to the workflow instance within the context of the groupware application during a period when the groupware application is offline, and further to provide the stored modifications to the interface server when the groupware application is brought online.

\* \* \* \* \*